(12) United States Patent
Suzuki et al.

(10) Patent No.: US 7,237,908 B2
(45) Date of Patent: Jul. 3, 2007

(54) IMAGE DISPLAY SYSTEM

(75) Inventors: Hiroshi Suzuki, Tokyo (JP); Kohei Teramoto, Tokyo (JP); Shinsuke Shikama, Tokyo (JP); Shuso Wadaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/555,998

(22) Filed: Nov. 2, 2006

(65) Prior Publication Data

US 2007/0058228 A1    Mar. 15, 2007

Related U.S. Application Data

(62) Division of application No. 10/492,853, filed on Apr. 16, 2004, now Pat. No. 7,163,297.

(51) Int. Cl.
G03B 21/22 (2006.01)
G03B 21/14 (2006.01)
G03B 21/28 (2006.01)
G03B 21/56 (2006.01)
G03B 21/60 (2006.01)

(52) U.S. Cl. ............................ 353/77; 353/78; 353/99; 359/457; 359/460

(58) Field of Classification Search ................ 353/70, 353/76, 77, 78, 79, 99; 359/456, 457, 460
See application file for complete search history.

(56) References Cited

U.S. PATENT DOCUMENTS

| | | | |
|---|---|---|---|
| 6,631,994 | B2 | 10/2003 | Suzuki et al. |
| 6,808,271 | B1 | 10/2004 | Kurematsu |
| 7,163,297 | B2 * | 1/2007 | Suzuki et al. ................ 353/77 |
| 2002/0044263 | A1 | 4/2002 | Takeuchi |

FOREIGN PATENT DOCUMENTS

| | | |
|---|---|---|
| EP | 0 633 491 A1 | 1/1995 |
| JP | 55-111936 A | 8/1980 |
| JP | 61-277935 A | 12/1986 |
| JP | 62-19837 A | 1/1987 |
| JP | 63-2031 A | 1/1988 |
| JP | 2-134527 A | 11/1990 |
| JP | 4-152332 A | 5/1992 |
| JP | 6-11767 A | 1/1994 |
| JP | 9-138349 A | 5/1997 |
| JP | 2001-51347 A | 2/2001 |
| JP | 2001-264634 A | 9/2001 |
| JP | 2004-138667 | 5/2004 |
| JP | 2005-234452 | 9/2005 |
| WO | WO-01/11425 A1 | 2/2001 |

* cited by examiner

OTHER PUBLICATIONS

"Merriam-Webster's Collegiate Dictionary", Tenth Edition, copyrights 1993 and 2001, p. 109.

Primary Examiner—Melissa Jan Koval
(74) Attorney, Agent, or Firm—Birch, Stewart, Kolasch & Birch, LLP

(57) ABSTRACT

An image display system includes a light valve 14 for providing image information to light converged by a converging lens 13 and for emitting the light, a projective optical system 20 including a refractive optical lens 21 for projecting the light from the light valve 14 and a convex mirror 22 for reflecting the light from the refractive optical lens 21 by using a reflecting surface thereof having negative power and for enlarging and projecting the reflected light, and a display 30 for receiving the light from the projective optical system 20 by way of a receiving surface 30A, wherein the light valve is placed away from an optical axis 23 of the projective optical system 20 and between a front surface of the display 30 and a rear surface of the projective optical system 20.

15 Claims, 13 Drawing Sheets

THICKNESS (a) THICKNESS

HEIGHT OF LOWER PORTION

EXIT PUPIL POSITION (c)

(b)

EXIT PUPIL POSITION

EXIT PUPIL POSITION (a)

(b)

IMAGE DISPLAY SYSTEM

This application is a Divisional of application Ser. No. 10/492,853, filed on Apr. 16, 2004 now U.S. Pat. NO. 7,163,297, the entire contents of which are hereby incorporated by reference and for which priority is claimed under 35 U.S.C. § 120.

FIELD OF THE INVENTION

The present invention relates to an image display system that enlarges and projects light having image information onto a rear of display means so as to display an image on the screen of the display means.

BACKGROUND OF THE INVENTION

FIG. 1 is a diagram showing the structure of a prior art image display system.

In the figure, reference numeral 1 denotes a light emitting body, reference numeral 2 denotes a parabolic mirror for reflecting light emitted out of the light emitting body 1 so that the light becomes substantially parallel light, and reference numeral 3 denotes a converging lens for converging the light reflected by the parabolic mirror 2. An illuminating light source system is comprised of the light emitting body 1, the parabolic mirror 2, and the converging lens 3.

Reference numeral 4 denotes a light valve for spatially modulating the intensity of the light converged by the converging lens 3 based on image information, reference numeral 5 denotes a projecting optical lens for projecting the light whose intensity is modulated by the light valve 4, and reference numeral 6 denotes a screen for displaying, as an image, the light projected thereonto by the projecting optical lens 5, Optical paths are designated by arrows in the figure.

Next, a description will be made as to an operation of the prior art image display system.

Light emitted out of the light emitting body 1 is reflected by the parabolic mirror 2, and is then converged to the light valve 4 by the converging lens 3. The light valve 4 spatially modulates the intensity of the light converged by the converging lens 3 based on image information. The light whose intensity is modulated by the light valve 4 is projected onto the rear (i.e., a left-side surface as shown in FIG. 1) of the screen 6 by the projecting optical lens 5, and is displayed as an image on the screen 6. A user of the image display system can check the image visually from a front surface of the screen 6 of FIG. 1 (i.e., a right-side surface as shown in FIG. 1)

The image display system of FIG. 1 has a depth corresponding to a distance between the illuminating light source system comprised of the light emitting body 1, the parabolic mirror 2, and the converging lens 3 and the screen 6. It is preferable that such an image display system that can display an image of an identical size is so constructed that the depth thereof is provided as thinly as possible. For this reason, the prior art image display system as shown in FIG. 1 displays an image on the screen 6 by using a wide angle projecting optical lens 5 so that the depth of the image display system can be reduced and therefore the image display system can be slimmed down.

However, because the prior art image display system of FIG. 1 has a limitation on how wide angle the projecting optical lens 5 has, in order to further slim down the image display system, the prior art image display system further includes a plane mirror 7 that is inclined at 45 degrees with respect to a horizontal direction, for bending the optical path extending from the projecting optical lens 5, and for projecting the light from the projecting optical lens 5 onto the rear of the screen 6, as shown in FIG. 2.

In the image display system of FIG. 2, some components, such as the illuminating light source system, the light valve 4, and the projecting optical lens 5, are arranged in a direction of the height of the image display system (i.e., in a vertical direction of FIG. 2), and the slimming down of the image display system can be further implemented. In this case, the depth of the image display system corresponds to the distance between the plane mirror 7 and the screen 6. Although the image display system can be further slimmed down by enlarging the inclination angle of the plane mirror 7 with respect to the horizontal direction to more than 45 degrees, the light valve 4 and the light source unit interfere with the projected light, and therefore the light is eclipsed and then deviates from the optical path to the screen 6.

Japanese patent application publication (TOKKAIHEI) No. 6-11767 discloses an image display system for reflecting light by using a convex mirror, instead of the plane mirror 7 as shown in FIG. 2, and for enlarging and displaying an image on a screen 6. However, this prior art image display system suffers from a drawback of displaying a distorted image on the screen 6.

A problem with prior art image display systems constructed as mentioned above is that there is a limitation on the slimming down of the prior art image display system, and the prior art image display system cannot be further slimmed down.

The present invention is proposed to solve the above-mentioned problem, and it is therefore an object of the present invention to provide an image display system that can enlarge and display an image while reducing distortion of the image and that can be further slimmed down as compared with prior art image display systems.

DISCLOSURE OF THE INVENTION

In accordance with the present invention, there is provided an image display system including transmission means for providing image information to illuminating light and for transmitting the illuminating light as an optical image signal, projective optical means provided with a refractive optical unit for projecting the optical image signal transmitted thereto from the transmission means and a reflective optical unit for reflecting the optical image signal projected by the refractive optical unit, and display means for receiving the optical image signal by way of the projective optical means and for displaying an image based on the image information, the transmission means being placed away from an optical axis of the projective optical means, and being also placed between a front surface of the display means and a rear surface of the projective optical means.

As a result, the present invention offers an advantage of being able to further slim down the image display system as compared with prior art image display systems.

In accordance with the present invention, there is provided an image display system including transmission means for providing image information to illuminating light and for transmitting the illuminating light as an optical image signal, projective optical means provided with a refractive optical unit for projecting the optical image signal transmitted thereto from the transmission means and a reflective optical unit for reflecting the optical image signal projected by the refractive optical unit, and display means for receiving the optical image signal by way of the projective optical means and for displaying an image based on the image information, the transmission means being placed below a horizontal plane including an optical axis of the projective optical means, and the display means being placed above the horizontal plane including the optical axis of the projective optical means.

As a result, the present invention offers an advantage of being able to further slim down the image display system as compared with prior art image display systems.

PREFERRED EMBODIMENTS OF THE INVENTION

In order to explain the present invention in greater detail, the preferred embodiments will be described below with reference to the accompanying figures.

Embodiment 1

Figure 1:
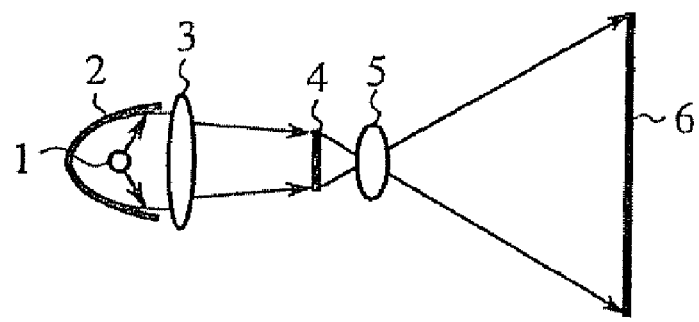
FIG. 1 is a diagram showing the structure of a prior art image display system.
Figure 2:
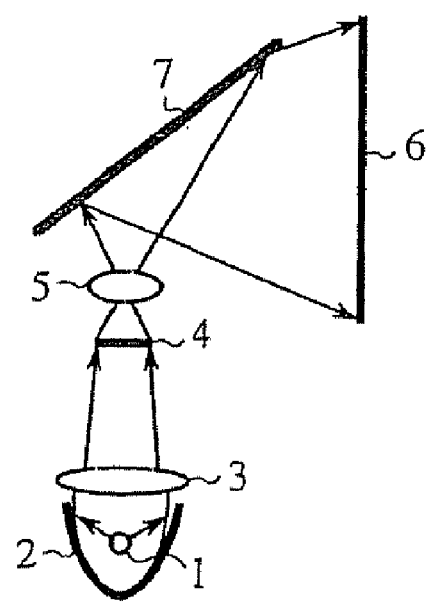
FIG. 2 is a diagram showing the structure of a prior art image display system in which a plane mirror is disposed.
Figure 3:
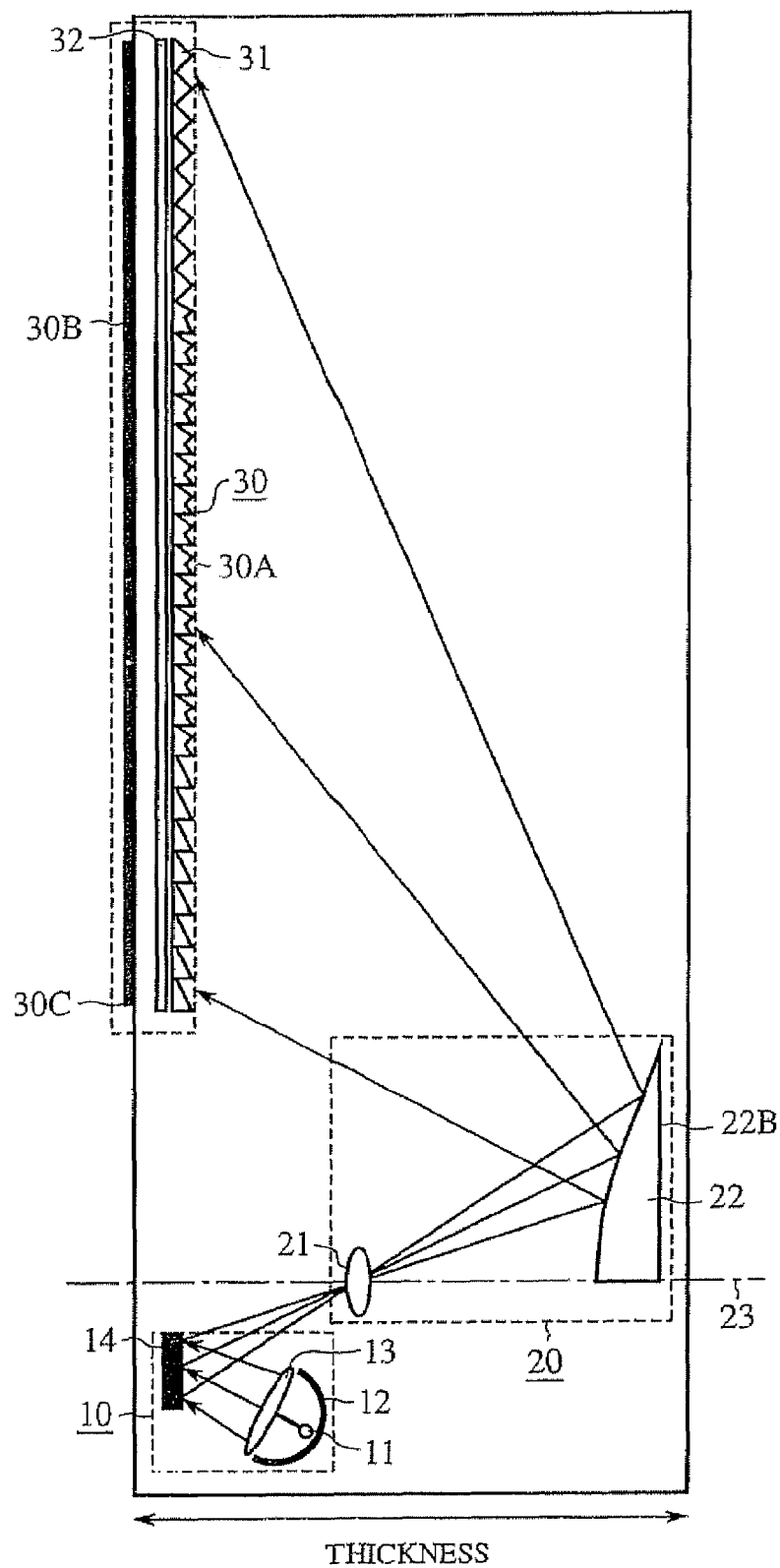
FIG. 3 is a diagram showing the structure of an image display system in accordance with embodiment 1 of the present invention.

FIG. 3 is a diagram showing the structure of an image display system in accordance with embodiment 1 of the present invention, and shows the structure in cross section when viewed from a lateral surface thereof. Optical paths are designated by arrows in the figure.

In the image display system of FIG. 3, reference numeral 10 denotes transmission means for emitting light (i.e., an optical image signal) having image information, reference numeral 20 denotes projective optical means for enlarging and projecting the light emitted out of the transmission means 10, and reference numeral 30 denotes display means for receiving the light from the projective optical means 20 and for displaying an image based on the image information included in the light.

In the transmission means 10 of FIG. 3, reference numeral 11 denotes a light emitting body for emitting light, reference numeral 12 denotes a parabolic mirror for reflecting the light emitted out of the light emitting body 11 located at a focal point of the parabolic mirror, and for making the light be a substantially-parallel light beam, and reference numeral 13 denotes a converging lens for converging the parallel light beam reflected from the parabolic mirror 12. An illuminating light source system is provided with the light emitting body 11, the parabolic mirror 12, and the converging lens 13.

Furthermore, in the transmission means 10 of FIG. 3, reference numeral 14 denotes a light valve (i.e., light valve means) for modulating the intensity of the light (i.e., illuminating light) converged by the converging lens 13 according to the image information included in the light. As shown in FIG. 3, the transmission means 10 includes, as a light modulating device of reflective type, the light valve 14. As an alternative, the present invention can be applied to an image display system provided with a light modulating device of arbitrary type, such as a liquid crystal of transmission type. Furthermore, the light valve 14 of the transmission means 10 can be a self-emissive type one or non-emissive type one.

In the projective optical means 20 of FIG. 3, reference numeral 21 denotes a refractive optical lens (i.e., a refractive optical unit), and reference numeral 22 denotes a convex mirror (i e., a reflective optical unit). In order to decrease the distortion aberration, both the refractive optical lens 21 and the convex mirror 22 have an aspheric surface configuration, and the refractive optical lens 21 is so constructed as to provide distortion aberration and field curvature for incident light in order to counterbalance the distortion aberration and the field curvature caused by the convex mirror 22.

Furthermore, in the projective optical means 20 of FIG. 3, reference numeral 23 denotes an optical axis of the projective optical means 20. In the example of FIG. 3, the refractive optical lens 21 and the convex mirror 22 share the optical axis 23. In accordance with this embodiment 1, the transmission means 10 is so placed as to be away from the optical axis 23, and is placed between a plane (i.e., a front surface of the display means 30) including an image display screen 30B of the display means 30 and a plane (i.e., a rear surface of the projective optical means 20) including a rear surface 22B of the convex mirror 22 of the projective optical means 20. In this case, the front surface of the display means 30 and the rear surface of the projective optical means 20 are defined based on the image display system, and the image display system has a front surface on the side of the display means 30. With a horizontal plane including the optical axis 23 of the projective optical means 20 being a boundary, the transmission means 10 is placed below the horizontal plane, and the display means 30 is placed above the horizontal plane. In other words, the projective optical means 20 is placed above the transmission means 10 so that the projective optical means 20 is positioned in a slanting upward direction with respect to a rear side of the transmission means 10, and the display means 30 is placed above the projective optical means 20 so that the display means 30 is positioned in a slanting upward direction with respect to a front side of the projective optical means 20.

In the display means 30 of FIG. 3, reference numeral 30A denotes a receiving surface of the display means 30, and reference numeral 30B denotes the image display screen of the display means 30, the image display screen having a rectangular shape. The display means 30 is provided with a Fresnel lens 31 and a lenticular 32. After receiving light from the convex mirror 22 by way of the receiving surface 30A thereof, the display means 30 makes the light be a substantially-parallel light beam by using prism portions formed at pitches in the Fresnel lens 31 and emits the substantially-parallel light beam to the lenticular 32. The lenticular 32 forms an image from the light beam emitted from the Fresnel lens 31 and then diffuses the light beam, and displays the image on the image display screen 30B. A detailed explanation of the display means 30 will be explained in Embodiment 3.

In this embodiment 1, the display means 30 and the light valve 14 are arranged so that a reflecting surface (i.e., a surface via which an image is output) of the light valve 14 and the receiving surface 30A of the display means 30 are substantially parallel to each other, and so that the depth of the image display system is minimized. Furthermore, in order to prevent any eclipse of the projected light, the light valve 14 and the display means 30 are so arranged that they don't overlap each other with respect to the direction of height. In addition, the projective optical means 20 is so arranged that while the above-mentioned requirements for the arrangement of the light valve 14 and the display means 30 can be satisfied, the optical phase conjugation between the light valve 14 and the display means 30 can be maintained.

Next, a description will be made as to an operation of the image display system in accordance with embodiment 1 of the present invention.

Light emitted out of the light emitting body 11 is reflected by the parabolic mirror 12, and is then incident upon the reflecting surface of the light valve 14 in a slanting direction and by way of the converging lens 13. The light valve 14 spatially modulates the intensity of the incident light based on the image information and reflects it to the projective optical means 20. Because the light valve 14 is a light modulating device of reflective type, it can modulate the intensity of the light that is incident upon the reflecting surface thereof in a slanting direction and can reflect the intensity-modulated light.

In the projective optical means 20, the refractive optical lens 21 receives the light diagonally incident thereupon from the transmission means 10 with respect to the optical axis 23 and projects the light onto the convex mirror 22. As shown in FIG. 3, the refractive optical lens 21 is so placed that the optical axis 23 of the refractive optical lens 21 is substantially perpendicular to the reflecting surface of the light valve 14 and the receiving surface 30A of the display means 30, and is offset with respect to both the center of the light valve 14 and the center of the display means 30. Therefore, only a part of the angle of view of the refractive optical lens 21 is used in order to project the light from the light valve 14 onto the convex mirror 22. As shown in FIG. 3, because the light from the transmission means 10 is traveling in an upward direction and is incident upon a lower part of the refractive optical lens 21, the refractive optical lens 21 emits the incident light traveling in an upward direction from an upper part thereof.

The convex mirror 22 reflects the image of the light by using the reflecting surface thereof having negative power, and then enlarges and projects the image onto the display means 30. Because the light from the transmission means 10 is diagonally incident upon the convex mirror 22 with respect to the optical axis 23, the central part of the reflecting surface of the convex mirror 22 is not used for projecting the image onto the display means 30, The display means 30 receives the light from the convex mirror 22 by way of the receiving surface 30A, and displays the image on the image display screen 30B.

Thus, because the display means 30 and the transmission means 10 are arranged above and below the horizontal plane including the optical axis 23 of the projective optical means 20, respectively, and the transmission means 10 is placed away from the optical axis 23 of the projective optical means 20, the light emitted out of the transmission means 10 is diagonally incident upon the projective optical means 20 with respect to the optical axis 23 and the light from the projective optical means 20 is diagonally projected onto the display means 30 with respect to the optical axis 23. Therefore, because the light beam traveling from the transmission means 10 to the convex mirror 22 and the light beam traveling from the convex mirror 22 to the display means 30 propagate in the image display system while overlapping each other in a part of the inner space of the image display system (i.e., sharing the part of the inner space of the image display system), the limited inner space can be used effectively.

At this time, in order to reduce the thickness of the image display system such that it becomes substantially equal to the distance between the rear surface of the projective optical means 20 and the front surface of the display means 30, the transmission means 10 is placed in a space that is located between the rear surface of the projective optical means 20 (e g., in the case of FIG. 3, a plane including the rear surface 22B of the convex mirror 22) and the front surface of the display means 30 (e.g., a plane including the image display screen 30B) and that is away from the optical axis 23. As a result, the image display system can be further slimmed down as compared with prior art image display systems. It should be noted that the arrangement of the transmission means 10 is carried out so that the height of a lower portion of the image display system including the transmission means and the projective optical means doesn't increase. Furthermore, because the transmission means 10 is placed below the horizontal plane including the optical axis 23 of the projective optical means 20 and the display means 30 is placed above the horizontal plane, the image display system can be further slimmed down as compared with prior art image display systems.

As mentioned above, in accordance with this embodiment 1, the image display system includes the transmission means 10 provided with the light emitting body 11 for emitting light, the parabolic mirror 12 for reflecting the light emitted out of the light emitting body 11 and for emitting the light as substantially-parallel light, the converging lens 13 for converging the parallel light from the parabolic mirror 12, and the light valve 14 for providing image information to the light converged by the converging lens 13 and for emitting the light, the projective optical means 20 provided with the refractive optical lens 21 for projecting the light from the transmission means 10 and the convex mirror 22 for reflecting the light from the refractive optical lens 21 by using the reflecting surface thereof having negative power and for enlarging and projecting the reflected light, and the display means 30 for receiving the light from the projective optical means 20 by way of the receiving surface 30A thereof and for displaying an image on the image display screen 30B thereof based on the image information included in the received light, the transmission means 10 being placed away from the optical axis 23 of the projective optical means 20 and the transmission means 10 being placed between the front surface of the display means 30 and the rear surface of the projective optical means 20. Therefore, this embodiment 1 offers an advantage of being able to further slim down the image display system as compared with prior art.

Furthermore, in accordance with this embodiment 1, the image display system includes the transmission means 10 provided with the light emitting body 11 for emitting light, the parabolic mirror 12 for reflecting the light emitted out of the light emitting body 11 and for emitting the light as substantially-parallel light, the converging lens 13 for converging the parallel light from the parabolic mirror 12, and the light valve 14 for providing image information to the light converged by the converging lens 13 and for emitting the light, the projective optical means 20 provided with the refractive optical lens 21 for projecting the light from the transmission means 10 and the convex mirror 22 for reflecting the light from the refractive optical lens 21 by using the reflecting surface thereof having negative power and for enlarging and projecting the reflected light, and the display means 30 for receiving the light from the projective optical means 20 by way of the receiving surface 30A thereof and for displaying an image on the image display screen 30B thereof based on the image information, the transmission means 10 being placed below a horizontal plane including the optical axis 23 of the projective optical means 20 and the display means 30 being placed above the horizontal plane including the optical axis 23 of the projective optical means 20. Therefore, this embodiment 1 offers an advantage of being able to further slim down the image display system as compared with prior art.

In addition, in accordance with this embodiment 1, because the display means 30 is so placed as to be substantially perpendicular to the optical axis 23 of the projective optical means 20, this embodiment 1 offers another advantage of being able to easily perform alignment between the projective optical means 20 and the display means 30.

Furthermore, in accordance with this embodiment 1, because the light valve 14 that constitutes the transmission means 10 and the display means 30 are so arranged that the reflecting surface (i.e., the image exit surface) of the light valve 14 and the display means 30 are substantially parallel to each other, this embodiment 1 offers a further advantage of being able to display an image on the image display screen 30B with the distortion of the image reduced.

Embodiment 2

In this embodiment 2, an image display system provided with at least one optical path bending means disposed on an optical path extending from transmission means 10 to display means 30 will be explained.

Figure 4:
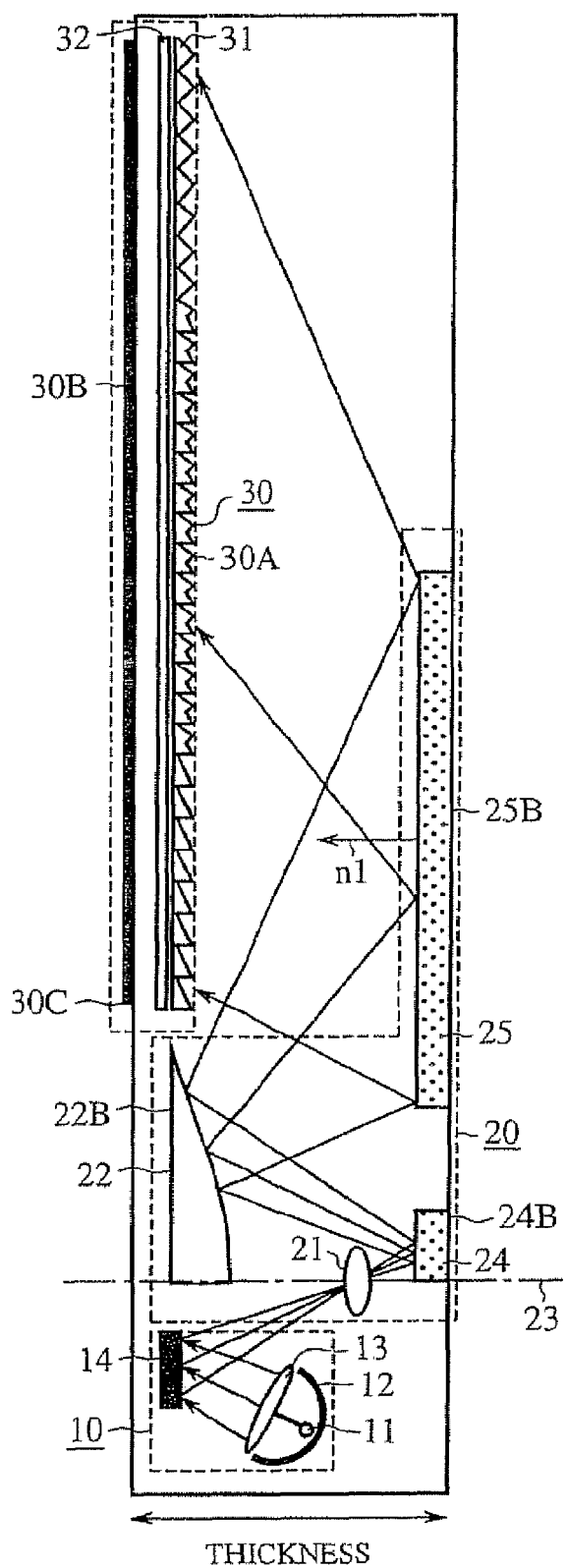
FIG. 4 is a diagram showing the structure of an image display system in accordance with embodiment 2 of the present invention.

FIG. 4 is a diagram showing the structure of the image display system in accordance with embodiment 2 of the present invention, and shows the structure in cross section when viewed from a lateral surface thereof. The same components as shown in FIG. 3 or like components are designated by the same reference numerals. Optical paths are designated by arrows in FIG. 4.

In FIG. 4, reference numerals 24 and 25 denote first and second optical path bending reflectors (i.e., projective optical means) that are provided as optical path bending means, respectively. The first optical path bending reflector 24 and the second optical path bending reflector 25 are disposed on an optical path extending from a refractive optical lens 21 to a convex mirror 22 and on an optical path extending from the convex mirror 22 to the display means 30, respectively. When the second optical path bending reflector 25 and the display means 3 are arranged so that a normal vector n1 that is oriented in a direction of the normal to a reflecting surface of the optical path bending reflector 25 is substantially parallel to a plane including an optical axis 23 of the projective optical means 20 and being parallel to a lower side 30C of an image display screen 30B of the display means 30 (i.e., so that the reflecting surface of the optical path bending reflector 25 and the image display screen of the display means 30 are substantially parallel to each other), the image display system can be further slimmed down.

In FIG. 4, the transmission means 10 and the display means 30 are arranged below and above a horizontal plane including the optical axis 23 of the projective optical means 20, respectively Furthermore, in order to prevent any light eclipse, the display means 30 is placed almost directly above the convex mirror 22 and rear surfaces 24B and 25B of the first and second optical path bending reflectors 24 and 25 are arranged in a substantially-identical plane, In addition, a rear surface 22B of the convex mirror 22 and the image display screen 30B are arranged in a substantially-identical plane.

In accordance with the structure of embodiment 1, a rear surface of the projective optical means 20 is determined by the rear surface 22B of the convex mirror 22. In contrast, in accordance with this embodiment 2, because the rear surface 22B of the convex mirror 22 faces toward the same direction as the image display screen 30, the rear surface 22B of the convex mirror 22 cannot become the rear surface of the projective optical means 20 and the rear surface of the projective optical means 20 is determined by both a plane including the rear surface 24B of the first optical path bending reflector 24 that faces toward a direction opposite to that which the image display screen 30B faces toward and a plane including the rear surface 25B of the second optical path bending reflector 25. The transmission means 10 is placed between the rear surface of the projective optical means 20 and the front surface of the display means 30 (i.e., a plane including the image display screen 30B) so that the transmission means 10 is away from the optical axis 23.

Next, a description will be made as to an operation of the image display system in accordance with embodiment 2 of the present invention.

Light emitted out of the refractive optical lens 21 is reflected by the first optical path bending reflector 24, the convex mirror 22, and the second optical path bending reflector 25, and then travels toward the display means 30. At this time, a light beam traveling from the first optical path bending reflector 24 to the convex mirror 22, a light beam traveling from the convex mirror 22 to the second optical path bending reflector 25, and a light beam traveling from the second optical path bending reflector 25 to the display means 30 can propagate while overlapping one another in parts of the inner space of the image display system (i.e., sharing the parts of the inner space of the image display system). Therefore the image display system can project the light emitted out of the transmission means onto the display means 30 with a smaller inner space as compared with that as shown in FIG. 3. In other words, the provision of the first and second optical path bending reflectors 24 and 25 as shown in FIG. 4 makes it possible to use the inner space of the image display system of FIG. 4 more effectively.

Therefore, the image display system in accordance with this embodiment 2 can be further slimmed down as compared with that of embodiment 1 when the image display screen 30B of the display means 30 has the same size as that of the image display system in accordance with embodiment 1, whereas the image display system in accordance with this embodiment 2 can display a larger image on the image display screen 30B of the display means 30 as compared with that of embodiment 1 when the image display system has the same thickness as that in accordance with embodiment 1.

When the optical path bending means, such as the first and second optical path bending reflectors 24 and 25, are applied to the image display system, it is important to arrange them by effectively using the inner space of the image display system so that the light emitted out of the transmission means can be prevented from being eclipsed by the optical path bending means, and the thickness of the image display system is not increased and the height of a lower portion of the image display system including the transmission means and part of the projective optical means is not increased.

In the above-mentioned example, the first and second optical path bending reflectors 24 and 25 are used as the optical path bending means, as shown in FIG. 4. However, the positions where the optical path bending means are arranged on the optical path are not limited to the ones shown in the figure. When the refractive optical lens 21 consists of a plurality of lens elements, for example, the first optical path bending reflector 24 can be placed within the refractive optical lens 21.

In addition, the number of optical path bending means is not limited. For example, an addition of a third optical path bending reflector to the structure of FIG. 4, the third optical path bending reflector being placed on an optical path extending from the second optical path bending reflector 25 to the display means 30, makes it possible to reflect light reflected by the second optical path bending reflector 25 toward the display means 30. Therefore, because a light beam traveling from the second optical path bending reflector 25 to the third optical path bending reflector and a light beam traveling from the third optical path bending reflector to the display means 30 can propagate while overlapping each other in a part of the inner space of the image display system, the image display system can be further slimmed down or the image display system can display a larger image.

In this case mentioned above, the rear surface of the projective optical means 20 is determined by a plane including the rear surface 229 of the convex mirror 22 that faces toward a direction opposite to the direction of the image display screen 30B or a plane including a rear surface of the third optical path bending reflector (because a plane including the rear surfaces 24B and 25B of the first and second optical path bending reflectors 24 and 25 face toward the same direction as the image display screen 30B, the plane cannot become the rear surface of the projective optical means 20), and the transmission means 10 only has to be placed between the rear surface of the projective optical means 20 and the plane (i.e., the front surface of the display means 30) including the image display screen 30B so as to be away from the optical axis 23. Thus, the orientation of the rear surface of the projective optical means 20 can change according to the positioning and structure of the convex mirror 22 and the positioning, number and structure of the optical path bending means.

In addition, each optical path bending means is not limited to a plane mirror, and can be an optical element other than a plane mirror, the optical element having an optical configuration that is designed by using optical path tracking such that the degree of freedom of the design for light beams is improved. As a result, it becomes possible to implement more fine control of light beams. For example, a second projective optical means (e.g., a refractive optical lens and a convex mirror) for reflecting light emitted out of the projective optical means 20 to the display means 30 can be used instead of the second optical path bending reflector 25, and prisms can be used, as the optical path bending means, instead of the first and second optical path bending reflectors 24 and 25.

As mentioned above, in accordance with this embodiment 2, because the projective optical means 20 is provided with the first and second optical path bending reflectors 24 and 25 disposed on an optical path extending from the transmission means 10 to the display means 30, the image display system can lead the light emitted out of the transmission means to the display means while using the inner space thereof more effectively, and the image display system can be further slimmed down.

Furthermore, in accordance with this embodiment 2, when the second optical path bending reflector 25 and the display means 3 are so arranged that the normal vector n1 that is oriented in the direction of the normal to the reflecting surface of the optical path bending reflector 25 is substantially parallel to a plane including the optical axis 23 of the projective optical means 20 and being parallel to the lower side of the image display screen 30B of the display means 30, the image display system can be further slimmed down.

Embodiment 3

In this embodiment 3, a relative arrangement condition on which a first optical path bending reflector 24 as shown in Embodiment 2 and a refractive optical lens 21 are relatively arranged with respect to a convex mirror 22 will be explained in order to reduce both the thickness of an image display system and the height of a lower portion of the image display system as much as possible. The image display system in accordance with this embodiment 3 is so constructed as to bend an optical path in a horizontal plane including an optical axis 23 by using the first optical path bending reflector 24 inserted between the refractive optical lens 21 and the convex mirror 22.

Figure 5:
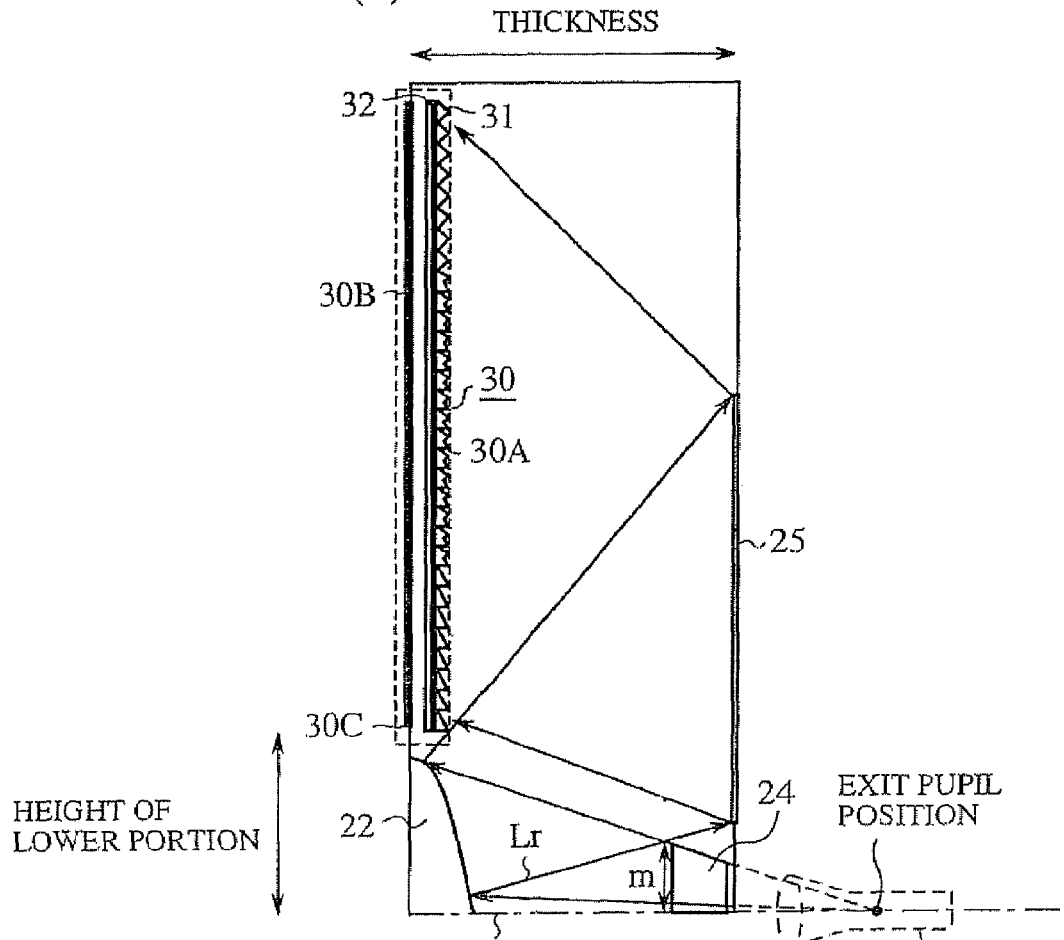
FIG. 5 is a diagram for explaining an arrangement condition on which a first optical path bending reflector of an image display system in accordance with embodiment 3 of the present invention is arranged.
Figure 5:
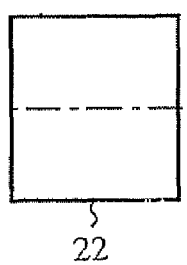
Figure 5:
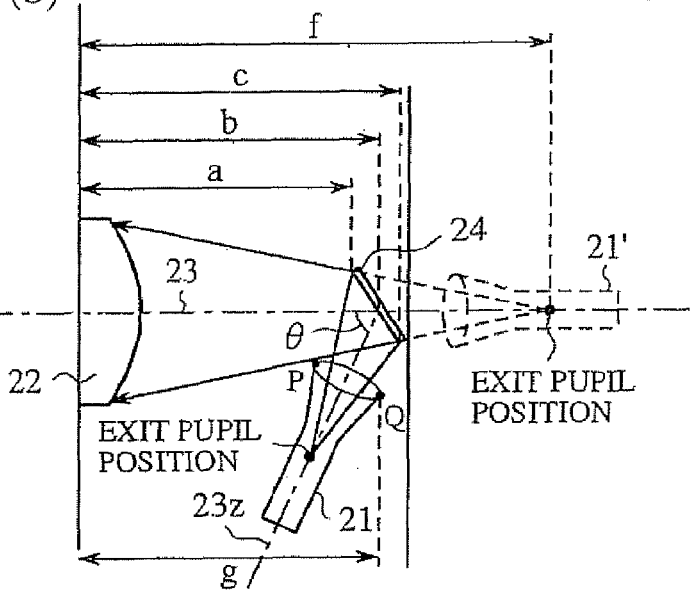

FIG. 5 is a diagram for explaining an arrangement condition on which the first optical path bending reflector 24 is placed in the image display system in accordance with embodiment 3 of the present invention. FIG. 5(a) and FIG. 5(b) are a side view and a top plan view of the image display system in accordance with embodiment 3 of the present invention, respectively, and FIG. 5(c) is a front view of the convex mirror 22. The same components as those shown in FIGS. 3 and 4 or like components are designated by the same reference numerals In FIG. 5, reference numeral 23z denotes an optical axis of the refractive optical lens 21 when the optical path bending reflector 24 is arranged, and reference numeral 21 denotes a refractive optical lens when the optical path bending reflector 24 is virtually removed and the optical axis 23 of the convex mirror 22 is made to match the optical axis 23Z.

The optical axis 23 and the optical axis 23z intersect at a bending angle θ in a horizontal plane. The optical axis 23z is rotated by only 180-θ degrees in the horizontal plane so as to change from a state in which it matches the optical axis 23 to a state as shown in FIG. 5(b), P and Q are two points where the horizontal plane including the optical axis 23z and the refractive optical lens 21 intersect, and one of the two points that is the nearest to the optical path extending from the optical path bending reflector 24 to the convex mirror 22 is P and the other point that is the nearest to an inner surface of the image display system on which a second optical path bending reflector 25 is mounted is Q.

Furthermore, the distance between a convex mirror mounting surface of the image display system on which the convex mirror 22 is mounted (i.e., a surface on which the reflective optical unit is mounted) and the position of the optical path bending reflector 24 (i.e., the position of a point of intersection of the optical axis 23 and the optical axis 23z) is b, and, when one of two points where the horizontal plane including the optical axis 23 and the optical path bending reflector 24 intersect and that is the nearest to the convex mirror mounting surface is called nearest point and the other point that is the furthest from the convex mirror mounting surface is called furthest point, the distance between the nearest point and the convex mirror mounting surface is a and the distance between the furthest point and the convex mirror mounting surface is c. The distance c is the longest distance between the convex mirror mounting surface and the optical bending reflector 24.

In addition, the distance between the highest point of the optical path bending reflector 24 and the optical axis 23 is m, the distance between the point Q and the convex mirror mounting surface is g, and the distance between the position of the exit pupil of the refractive optical lens 21' and the convex mirror mounting surface is f. The distance g is the longest distance between the convex mirror mounting surface and the refractive optical lens 21. Therefore, the sum of the distance between the position of the exit pupil of the refractive optical lens 21 and the position of the optical path bending reflector 24 and the distance in the horizontal direction between the position of the optical path bending reflector 24 and the convex mirror mounting surface also becomes f.

As can be seen from FIG. 5(a), in order to minimize the height of the lower portion of the image display system that is equal to the distance between the lowest end portion of the display means 30 and the optical axis 23, it is preferable to cause a light beam Lr, which will be reflected by the convex mirror 22 and will be traveling toward the lowest end portion of the display means 30, to pass through a lower portion while traveling as close as to the optical axis 23. On the other hand, when the optical path extending from the path bending reflector 24 to the convex mirror 22 is so arranged as to pass through an excessively low position, the optical path extending from the convex mirror 22 to the path bending reflector 25 is blocked by the optical path bending reflector 24, and this results in a shadow on the display means 30 where images cannot be displayed properly. In this case, the image display system cannot be put to practical use. It is therefore necessary to determine the size and position of the optical path bending reflector 24 such that the light beam reflected by the convex mirror 22 and then traveling toward the lowest end portion of the display means 30 is not blocked by the optical path bending reflector 24.

In order to make the light beam reflected by the convex mirror 22 pass through the lowest optical path, the position of the optical path bending reflector 24 is so determined that the distance a increases as much as possible. On the other hand, because the thickness of the image display system has a thickness limit dependent upon specifications covering the slimming down of the image display system, the distance c has to be equal to or less than this thickness limit.

When the optical path bending reflector 24 bends the optical path on the above-mentioned condition, if the distance f is too short, a part of the refractive optical lens 21 including the point P blocks the light beam reflected by the optical path bending reflector 24 and traveling toward the convex mirror 22. In order to prevent the part of the refractive optical lens 21 including the point P from blocking the light beam reflected by the optical path bending reflector 24 and traveling toward the convex mirror 22, the distance a may be reduced to shorter than necessary. On the other hand, when the distance f is too long, the refractive optical lens 21 has to be disposed away from the optical path bending reflector 24 more than necessary because of the condition of the position of the receiving surface of the convex mirror 22 and the condition of the position of the optical path bending reflector 24, and this results in an increase in the size of the optical path bending reflector 24. As a result, the height m of the optical path bending reflector 24 is increased and the optical path bending reflector 24 blocks the reflected light beam Lr reflected by the convex mirror 22 and traveling toward the lower end portion of the display means 30. Therefore, the distance f has an optimum value.

As can be seen from FIG. 5(b), when the bending angle θ is set to an excessively large value, the distance g or the distance c exceeds the thickness limit and the distance a decreases, and this results in an increase in the height of the position where the reflected light beam is traveling from the convex mirror 22 to the lower end portion of the display means 30

In contrast, when the bending angle θ is set to a small value, because the distance g or the distance c becomes small, too, either the refractive optical lens 21 or the optical path bending reflector 24 becomes advantageous from the viewpoint of the thickness of the image display system. However, when the bending angle θ is set to an excessively small value, the part of the refractive optical lens 21 including the point P enters the optical path extending from the optical path bending reflector 24 to the convex mirror 22 and therefore blocks the light beam. As a result, a shadow on which video (or images) cannot be projected is generated. Therefore, the bending angle θ has an optimum value, too.

Based on the above description, the bending angle θ of the optical path extending from the refractive optical lens 21 is so determined that the point P of the refractive optical lens is positioned as close as the optical path extending from the optical path bending reflector 24 to the convex mirror 22 within the bounds of not blocking the optical path.

Furthermore, when the bending angle θ is thus determined, because the distance g or the distance c restricts the thickness of the image display system at this time, the distance f is so determined that a longer one of those distances g and c becomes the thickness limit Particularly, when the distance c and the distance g are set to an identical value, the height of the lower portion of the image display system can be reduced to the lowest.

When the bending angle θ is provided in advance depending upon other conditions of the image display system, the above-mentioned procedure can be carried out similarly.

The above-mentioned results are summarized as shown in the following items 1 through 3. By optimizing the distance f and the bending angle θ as shown in the following items 1 to 3, the restriction on the thickness limit can be satisfied and the height of the lower portion of the image display system can be reduced without occurrence of a shadow on which video (or images) cannot be projected.

In the case of bending the optical path by using the optical path bending reflector 24, the bending angle θ of the optical path extending from the refractive optical lens 21 is so determined that the point P of the refractive optical lens is positioned as close as the optical path extending from the optical path bending reflector 24 to the convex mirror 22 within the bounds of not blocking the optical path.

In the case where the bending angle θ is determined in advance depending upon other arrangement conditions of the image display system, the point P of the refractive optical lens is positioned as close as the optical path extending from the optical path bending reflector 24 to the convex mirror 22 within the bounds of not blocking the optical path, and the distance f is so determined that the distances c or g becomes the thickness limit.

In order to reduce the height of the lower portion of the image display system to the lowest, the bending angle θ of the optical path extending from the refractive optical lens 21 is so determined that the point P of the refractive optical lens is positioned as close as the optical path extending from the optical path bending reflector 24 to the convex mirror 22 within the bounds of not blocking the optical path, and the distance c and the distance g are set to an identical value and the distance f is so determined that the distances c and g become the thickness limit.

By cutting away a part (i.e., non-transmission part) including the point P, in which no light beam passes through, from the refractive optical lens 21, it is possible to make the refractive optical lens 21 be closer to the optical path extending from the optical path bending reflector 24 to the convex mirror 22 as compared with the case where no part of the refractive optical lens 21 is cut away with respect to the optical path extending from the optical path bending reflector 24 to the convex mirror 22.

As mentioned above, in accordance with this embodiment 3, because the image display system includes the projective optical means 20 having at least one optical path bending means disposed on an optical path extending from the transmission means 10 to the display means 30, the optical path bending means bending the optical path in a horizontal plane, the image display system can lead the light emitted out of the transmission means to the display means by using the inner space thereof more effectively and the image display system can be further slimmed down.

Embodiment 4

In accordance with the present invention, a Fresnel lens that is well known can be applied to a display means 30. However, in accordance with the present invention, because an image display system enlarges light to be projected onto the display means 30 more greatly by using transmission means 10 and projective optical means 20 in order to reduce the thickness of the image display system that can display an image of the same size as those provided by prior art image display systems as compared with the prior art image display systems (or in order to display an image of a larger size on the screen of the image display system having the same thickness as prior art image display systems), prior art Fresnel lenses have a limitation on the light receiving performance thereof and can cause irregularities in the brightness of the image on an image display screen 30B, which vary from position to position on the image display screen 30B. In order to make the enlarged light to be projected onto the display means 30 pass through with high transmissivity and to display an image that is uniform and bright corner to corner on the image display screen 30B, the above-mentioned slimmed-down image display system in accordance with any one of embodiments 1 to 3 preferably uses a Fresnel lens 31 explained below.

Figure 6:
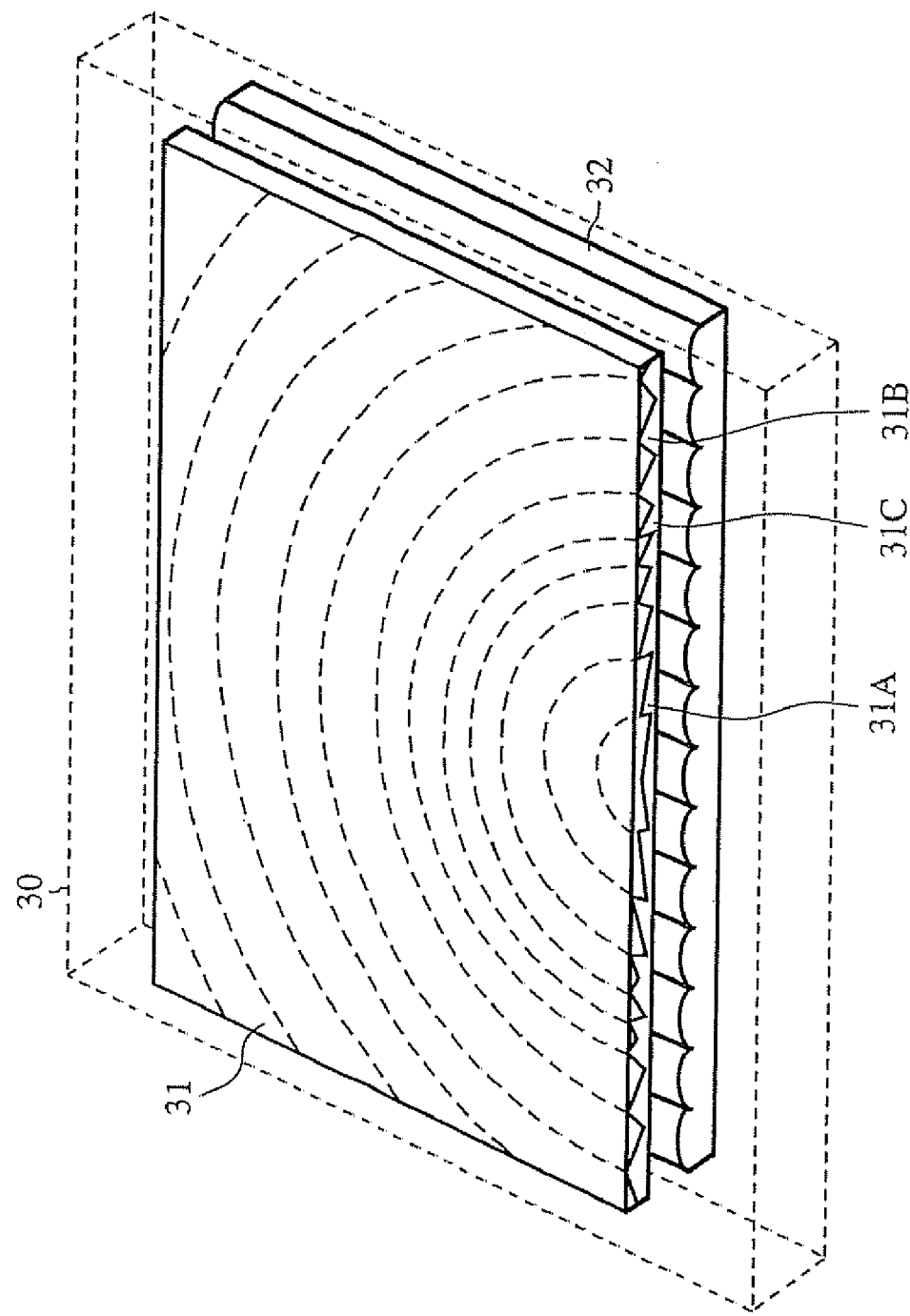
FIG. 6 is a perspective diagram showing the structure of display means which is applied to an image display system in accordance with embodiment 4 of the present invention.
Figure 7:
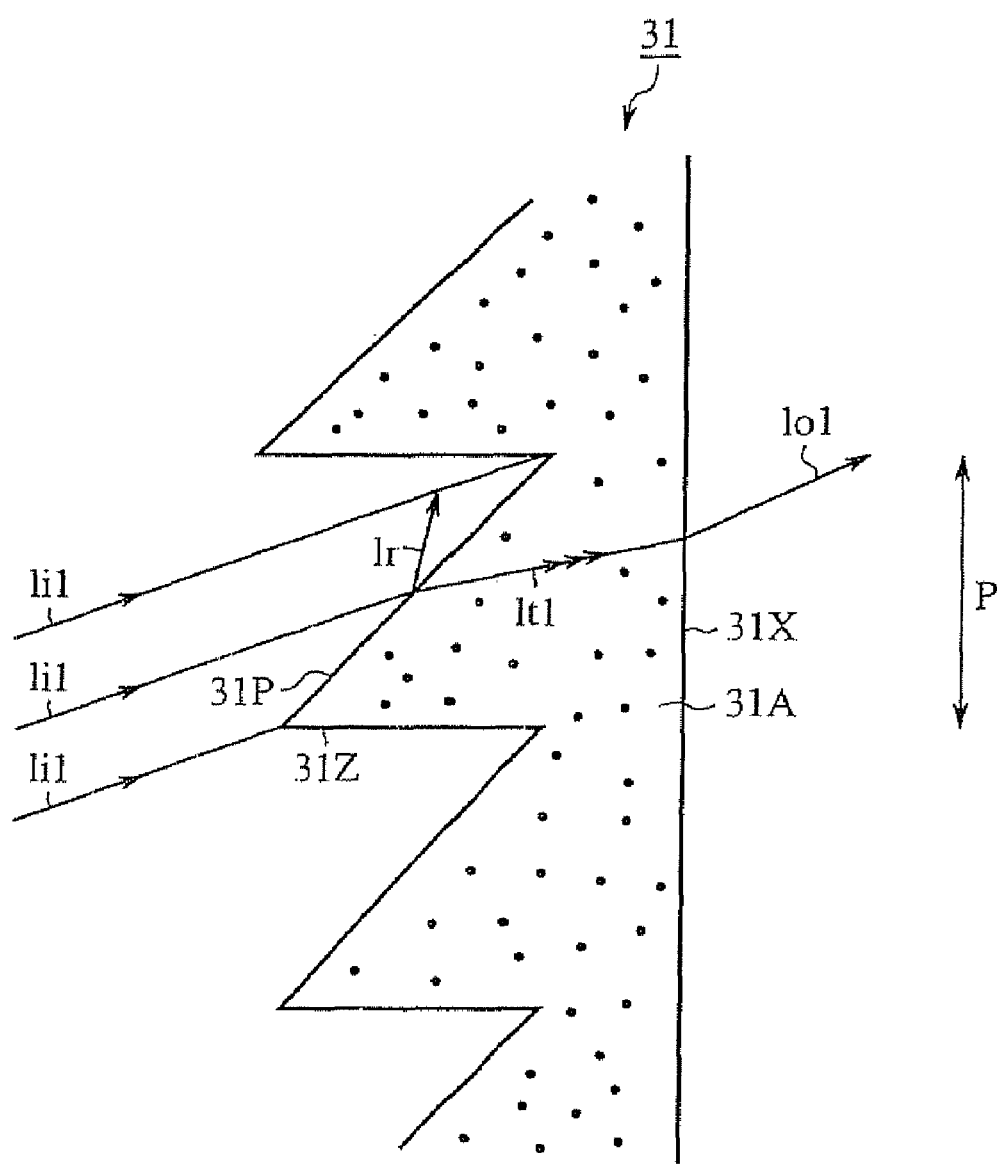
FIG. 7 is a diagram showing the cross-sectional shape of refractive prism portions formed in a Fresnel lens of the display means of FIG. 6.

FIG. 6 is a perspective diagram showing the structure of the display means 30 that is applied to the image display system in accordance with embodiment 4 of the present invention. FIGS. 7, 8B and 9 show the cross-sectional shape of prism portions formed in the Fresnel lens 31 of the display means 30 (i.e., the cross-sectional shape of prism portions of the Fresnel lens 31, which is taken on a plane including the optical axis of the Fresnel lens 31). The same components as those shown in FIG. 3 or like components are designated by the same reference numerals.

In FIGS. 6, 31A, 31B, and 31C denote refractive prism portions, totally reflective prism portions, and hybrid-type prism portions, which are formed at predetermined pitches of P in the Fresnel lens 31, respectively.

Each refractive prism portion 31A of FIG. 7 makes an incident light beam li1 be a transmitted light beam lt1 by refraction at an entrance surface 31P thereof, and emits the transmitted light beam lt1, as an outgoing light beam lo1, from an exit surface 31X thereof. Each refractive prism portion 31A implements high transmissivity at positions (i.e., at central positions of the Fresnel lens 31) corresponding to small incident angles because it bends the incident light beam li1 in a direction of the outgoing light beam lo1 by using refraction at the entrance surface 31P thereof.

Figure 8:
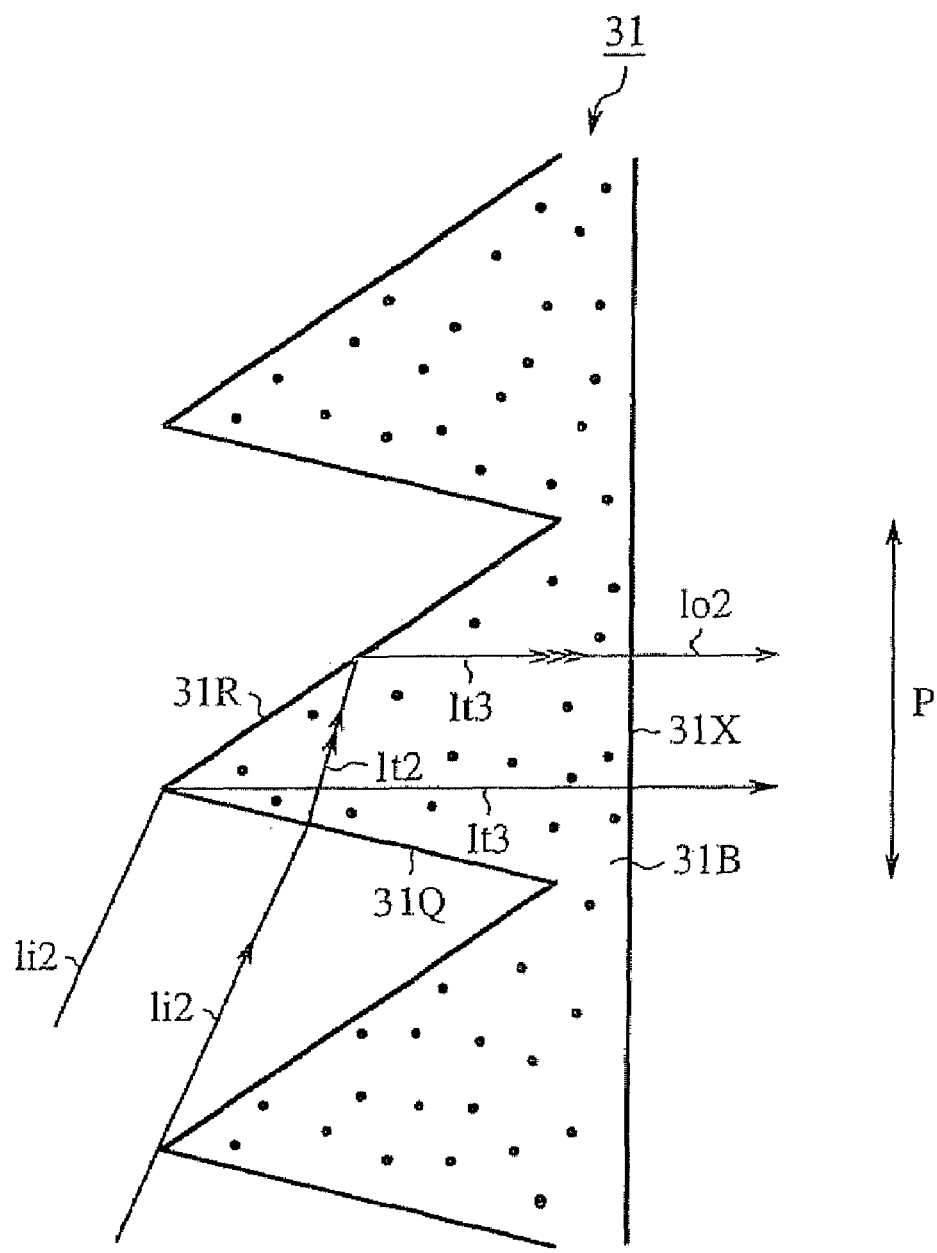
FIG. 8 is a diagram showing the cross-sectional shape of totally reflective prism portions formed in the Fresnel lens of the display means of FIG. 6.
Figure 9:
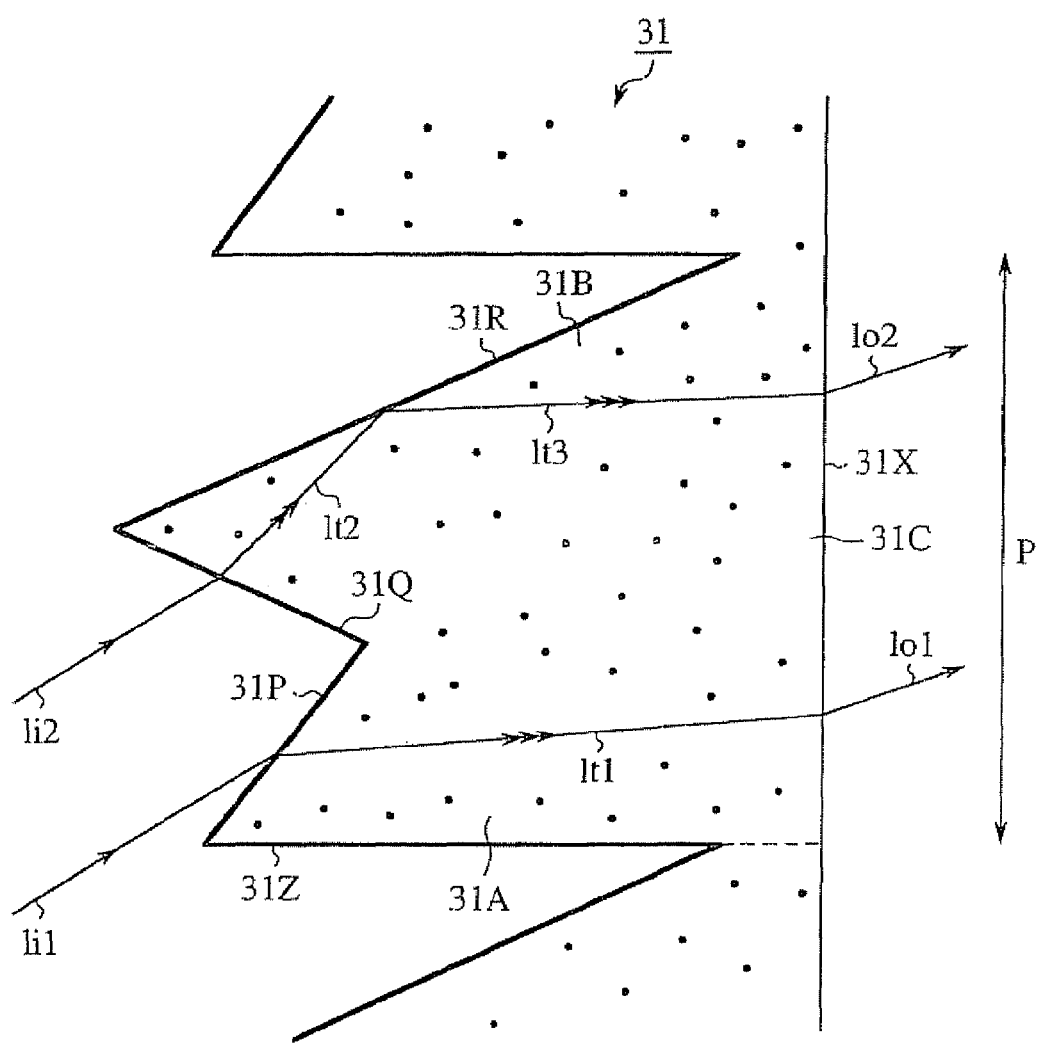
FIG. 9 is a diagram showing the cross-sectional shape of hybrid-type prism portions formed in the Fresnel lens of the display means of FIG. 6.

Each totally reflective prism portion 31B of FIG. 8 makes an incident light beam li2 be a transmitted light beam lt2 by refraction at an entrance surface 31Q thereof, makes the transmitted light beam lt2 be a transmitted light beam lt3 by total reflection at a totally reflective surface 31R thereof, and then emits the transmitted light beam lt3, as an outgoing light beam lo2, from an exit surface 31X. Each totally reflective prism portion 31B implements high transmissivity at positions (i.e., at peripheral positions of the Fresnel lens 31) corresponding to large incident angles because it bends the incident light beam li2 in a direction of the outgoing light beam lo2 by using total reflection at the totally reflective surface 31R thereof Each hybrid-type prism portion 31C of FIG. 9 is a combination of a refractive prism portion 31A and a totally reflective prism portion 31B that are formed at one pitch. Because each hybrid-type prism portion 31C has a refractive prism portion that exhibits high transmissivity for small incident angles and a totally reflective prism portion that exhibits high transmissivity for large incident angles, each hybrid-type prism portion 31C can implement excellent transmissivity for a wide range of incident angles.

As shown in FIG. 6, refractive prism portions 31A are formed in a central region of the Fresnel lens, which correspond to small incident angles, totally reflective prism portions 31B are formed in a peripheral region of the Fresnel lens, which correspond to large incident angles, and hybrid-type prism portions 31C are formed in the remaining region of the Fresnel lens, which is positioned between the central region and peripheral region of the Fresnel lens. As a result, the hybrid-type prism portions 31C reduce and control a rapid change in the transmissivity characteristic of the Fresnel lens between the refractive prism portions 31A and the totally reflective prism portions 31SB, and therefore a bright image without brightness irregularities can be displayed on the image display screen 30B, corner to corner.

Because the image display system in accordance with the present invention projects light reflected by a convex mirror 22 onto the display means 30 at a large angle in order to display an image of an identical size without interfering with the slimming down thereof, the Fresnel lens is so constructed as to have at least one pitch at which a totally reflective prism portion 31B, which can implement high transmissivity for large incident angles, is formed, so that the image display system can display a bright image.

In addition, one or more hybrid-type prism portions 31C formed at predetermined pitches, in each of which two or more different types of prism portions are formed, can ease the dependence of the transmissivity of the Fresnel lens 31 upon the angle of incident light and can reduce a rapid change in the transmissivity of the Fresnel lens 31 provided with the two or more types of prism portions. Each hybrid-type prism portion 31C is not limited to the combination of a refractive prism portion 31A and a totally reflective prism portion 31B. As an alternative, each hybrid-type prism portion 31C can be a combination of two (or more) types of refractive prism portions 31A, or a combination of two (or more) types of totally reflective prism portions 31B.

Furthermore, prism portions can be also formed on a side of an exit surface of the Fresnel lens 31 in addition to the above-mentioned prism portions formed on a side of an entrance surface of the Fresnel lens 31. For example, refractive prism portions 31A are disposed in the entrance and exit surfaces of the Fresnel lens 31, respectively. As an alternative, totally reflective prism portions 31B are disposed in the entrance surface of the Fresnel lens 31, and refractive prism portions 31A are disposed in the exit surface of the Fresnel lens 31. This variant makes it possible to implement fine control of light beams, In addition, there is no necessity to make the pitches on the entrance surface side of the Fresnel lens be equal to those on the exit surface side of the Fresnel lens, and both the pitches on the entrance surface side of the Fresnel lens and those on the exit surface side of the Fresnel lens can be varied according to the design of the Fresnel lens.

Light beams incident upon an ineffective surface 31Z that forms each refractive prism portion 31A or each hybrid-type prism portion 31C in cooperation with an entrance surface 31P and "out-of-course" light beams that don't reach the totally reflective surface 31R of each totally reflective prism portion 31B or each hybrid-type prism portion 31C become stray light beams in the image display system and can cause a reduction in the image quality. Measures directed toward the prevention of those stray light beams will be explained in Embodiment 5.

As mentioned above, in accordance with this embodiment 4, the display means 30 is provided with the Fresnel lens 31 having at least one pitch at which a totally reflective prism portion 31B is formed. Therefore, the present embodiment offers an advantage of being able to make light enlarged and projected pass through the display means with high transmissivity, and to display a bright image on the screen of the display means.

Furthermore, in accordance with this embodiment 4, the display means 30 is provided with the Fresnel lens 31 having at least one pitch at which two or more different types of prism portions are formed. Therefore, the present embodiment offers another advantage of being able to ease the dependence of the transmissivity of the Fresnel lens 31 upon the angle of incident light and can reduce a rapid change in the transmissivity of the Fresnel lens 31 provided with the two or more types of prism portions.

In addition, in accordance with this embodiment 4, the display means 30 is provided with the Fresnel lens in which prism portions are formed in both the entrance and exit surfaces of the Fresnel lens. Therefore, the present embodiment offers a further advantage of being able to implement fine control of light beams.

Furthermore, in accordance with this embodiment 4, because the display means 30 is provided with the Fresnel lens in which the prism portions formed in the entrance surface of the Fresnel lens have pitches different from those of the prism portions formed in the exit surface of the Fresnel lens. Therefore, the present embodiment offers another advantage of being able to implement more fine control of light beams.

Embodiment 5

In this embodiment 5, a display means 30 provided with a mechanism for absorbing stray light within an image display system so as to prevent degradation of the image quality will be explained.

A light beam (i.e., an ineffective light beam) incident upon an ineffective surface 31Z of a refractive prism portion 31A or a hybrid-type prism portion 31C becomes stray light beams within a Fresnel lens 31, and generates and displays multiple images, as well as a regular image, on an image display surface 30B of the display means and becomes a factor responsible for degradation of the image quality. Furthermore, according to circumstances, there exist "out-of-course" light beams that are not reflected by a totally reflective surface 31R of a totally reflective prism portion 31B or a hybrid-type prism portion 31C, and that become stray light beams and generate multiple images even though they enter an entrance surface 31Q of the totally reflective prism portion 31B or the hybrid-type prism portion 31C.

Figure 10:
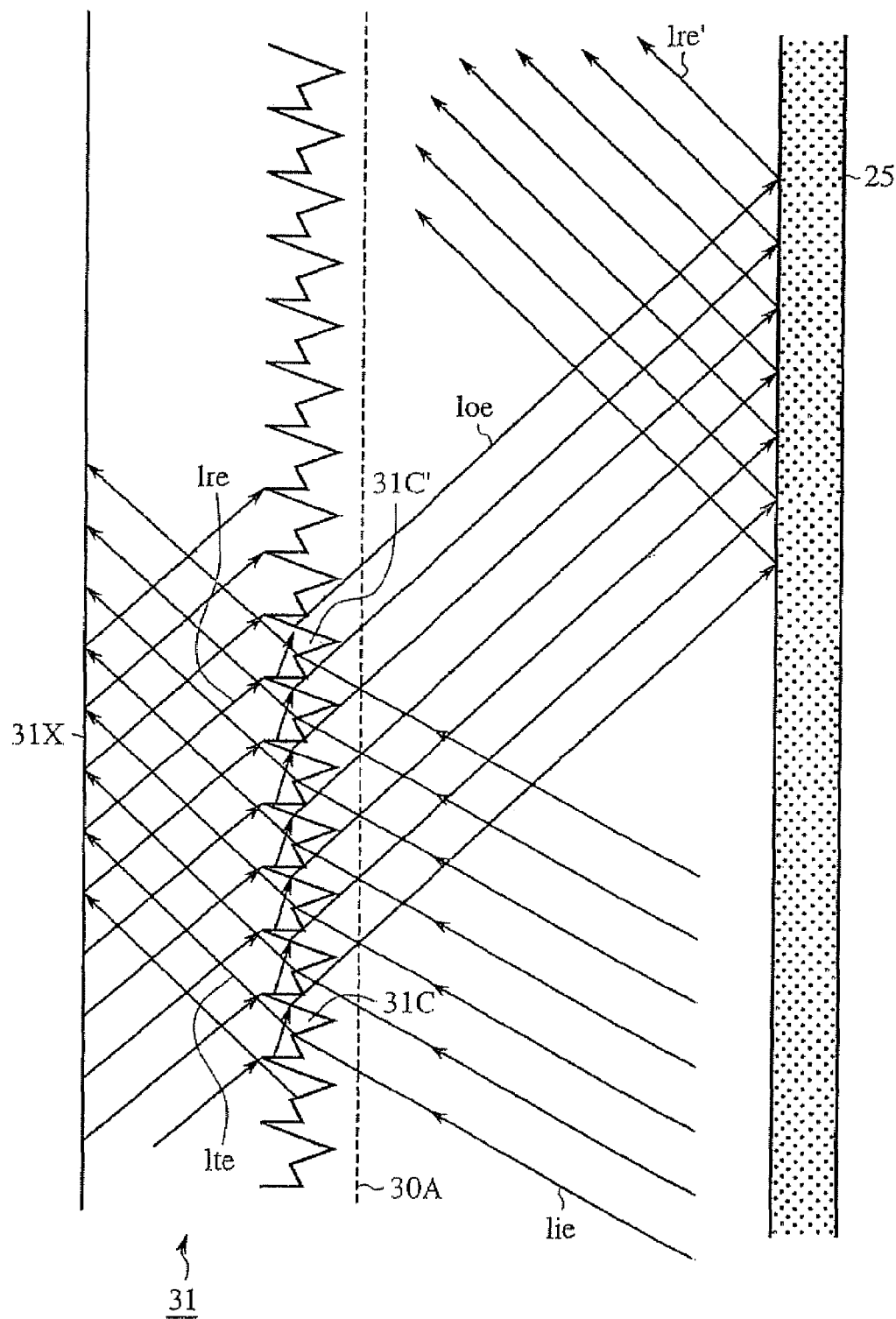
FIG. 10 is a diagram for explaining an example of action of stray light that causes multiple images on an image display screen.

FIG. 10 is a diagram for explaining an example of action of stray light that causes multiple images on the image display screen 30B, and particularly shows the action of "out-of-course" light beams in the image display system provided with an optical path bending reflector 25, which is explained in Embodiment 2.

As shown in FIG. 10, light beams lie incident upon hybrid-type prism portions 31C of the Fresnel lens 31 become "out-of-course" light beams lte that directly reach an exit surface 31X of the Fresnel lens without entering total reflection surfaces 31R after refracted at entrance surfaces 31Q. Because the "out-of-course" light beams lte travel toward the exit surface 31X at an angle different from a designed one, they are reflected greatly by the exit surface 31X and become reflected light beams lre. The reflected light beams lre then pass through other hybrid-type prism portions 31C' and exit from a receiving surface 30A of the display means 30, and become outgoing light beams loe These outgoing light beams loe are then reflected by the optical path bending reflector 25 and are incident upon the Fresnel lens 31 of the display means 30 again (i.e., become reflected light beams lre'). Finally, they pass through the Fresnel lens 31 and a lenticular 32 and cause multiple images that appear on the image display surface 30B.

Thus, "out-of-course" light beams mentioned above and ineffective light beams received by the ineffective surfaces 31Z of the hybrid-type prism portions 31C become stray light beams, and become a factor responsible for degradation of the image quality. To solve this problem, the image display system in accordance with this embodiment 5 is provided with a mechanism disposed in the Fresnel lens 31, for removing those stray light beams so as to prevent degradation of the image quality.

Figure 11:
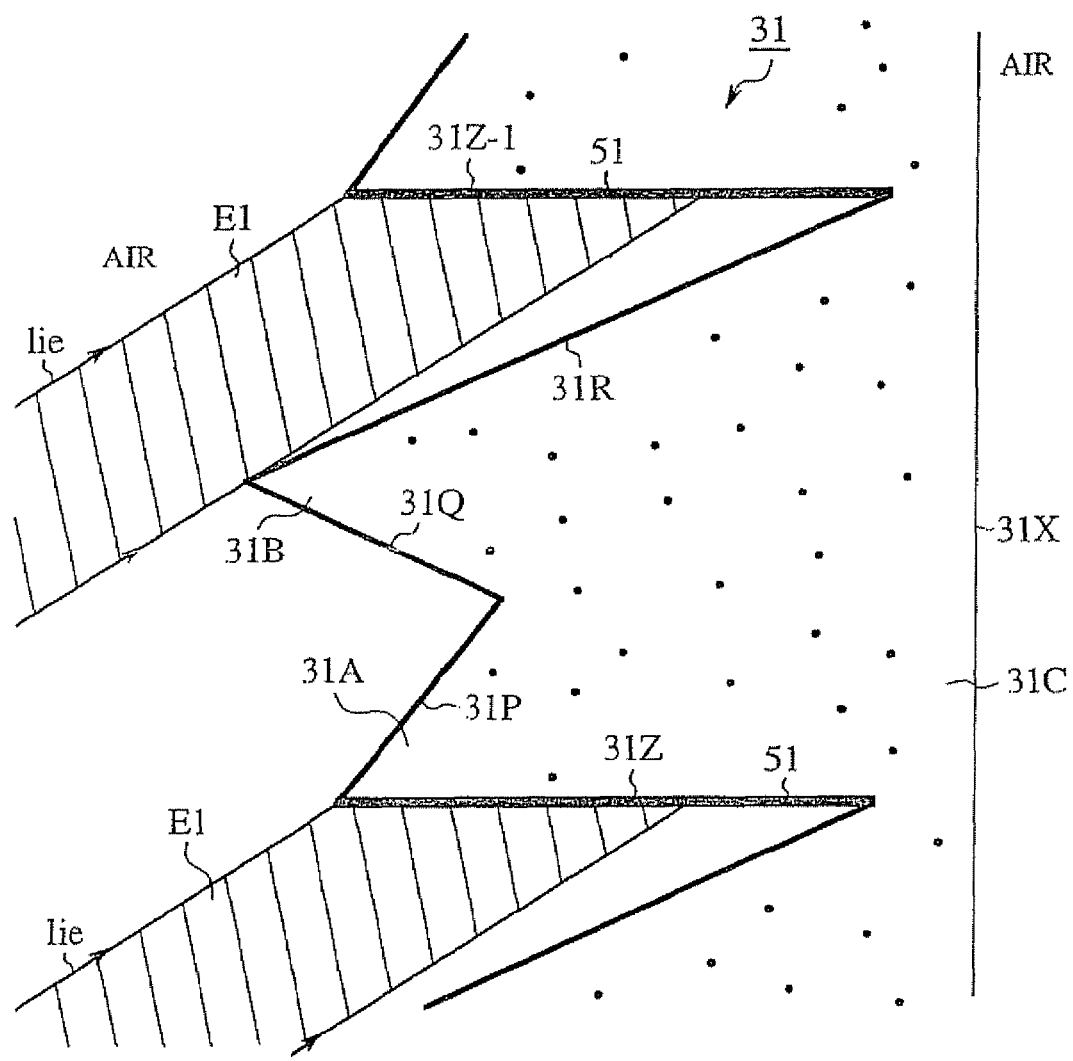
FIG. 11 is a diagram showing the cross-sectional shape of a Fresnel lens applied to display means of an image display system in accordance with embodiment 5 of the present invention.

FIG. 11 is a diagram showing the cross-sectional shape of the Fresnel lens applied to the display means of the image display system in accordance with embodiment 5 of the present invention, and shows a case where a mechanism for avoiding generation of multiple images that is caused by ineffective light beams is disposed on the entrance side of the Fresnel lens. The same components as shown in FIG. 9 or like components are designated by the same reference numerals.

In FIG. 11, reference numeral 51 denotes a photoabsorptive layer disposed on an ineffective surface 31Z, 31Z-1, or . . . of each refractive prism portion 31A.

In each of the refractive prism portions which are formed at pitches, the photoabsorptive layer 51 absorbs an ineffective light beam lie incident upon the invalid surface 31Z, 31Z-1, or . . . . Each photoabsorptive layer 51 disposed on the invalid surface 31Z, 31Z-1, or . . . can prevent stray light from being caused by an ineffective light beam lie incident thereupon, and can therefore avoid generation of multiple images on the image display surface 30B of the display means 30.

Figure 12:
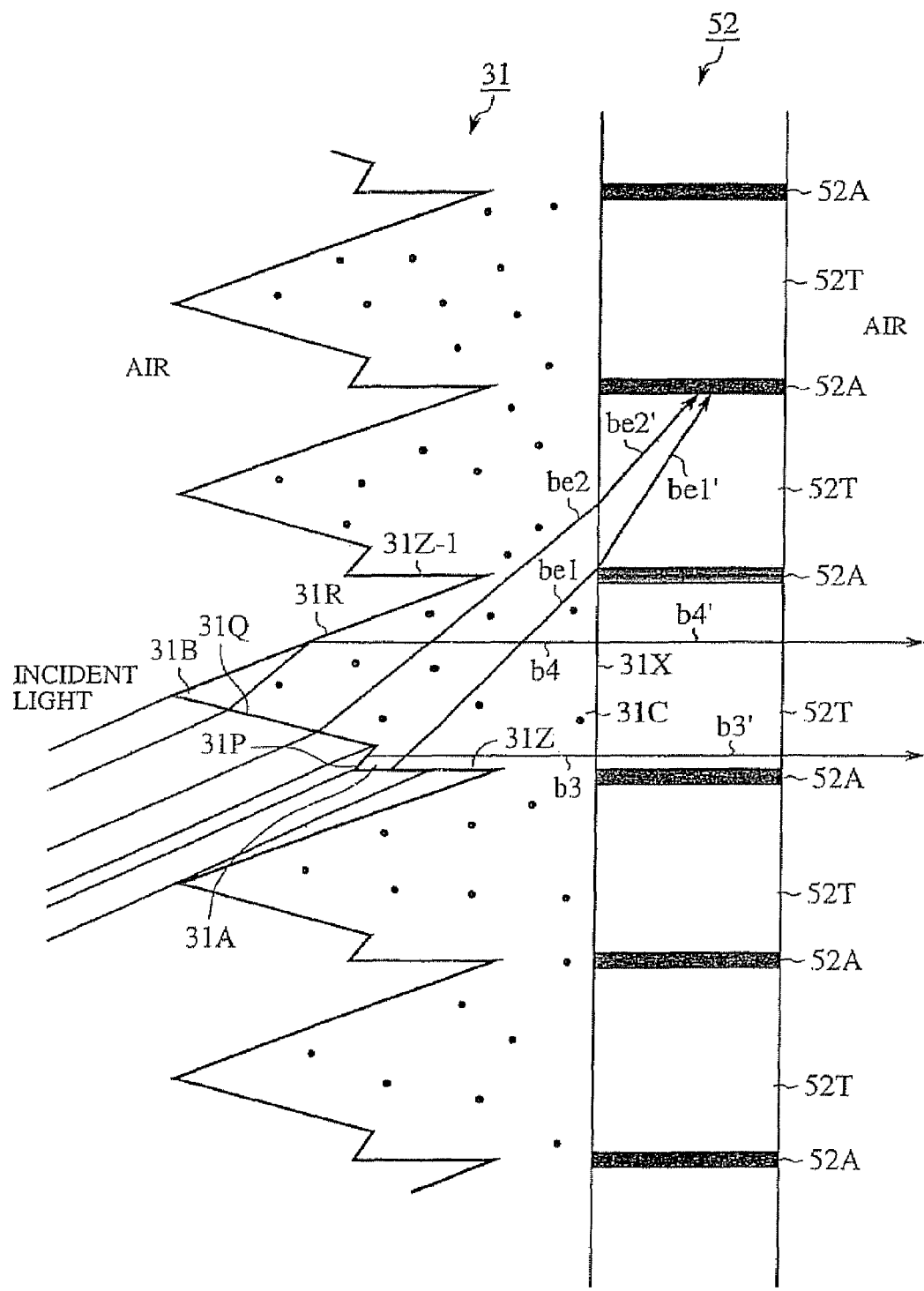
FIG. 12 is a diagram showing the cross-sectional shape of the Fresnel lens applied to the display means of the image display system in accordance with embodiment 5 of the present invention.

FIG. 12 is a diagram showing the cross-sectional shape of the Fresnel lens applied to the display means of the image display system in accordance with embodiment 5 of the present invention, and shows a case where a mechanism for absorbing stray light beams that originate from "out-of-course" light beams and ineffective light beams is disposed on the exit side of the Fresnel lens. The same components as shown in FIG. 9 or like components are designated by the same reference numerals.

In FIG. 12, reference numeral 52 denotes a stray light absorptive plate disposed on the exit surface 31X of the Fresnel lens 31 The stray light absorptive plate 52 is a parallel plate that has entrance and exit surfaces substantially parallel to the exit surface 31 of the Fresnel lens 31, and is provided with a plurality of light transmission layers 52T for allowing light to pass therethrough and a plurality of thin-film photoabsorptive layers 52A for absorbing light incident thereupon, which are alternately laminated so that they are arranged in substantially parallel with a not-shown optical axis of the Fresnel lens 31.

As shown in FIG. 12, as compared with the optical paths of transmitted light beams b3 and b4 that are respectively refracted at the entrance surface 31P of a refractive prism portion 31A and at the entrance surface 31Q of a totally reflective prism portion 31B, because both a stray light beam be1 incident by way of the invalid surface 31Z, 31Z-1, or . . . and a stray light beam be2 that is an "out-of-course" light beam incident by way of the entrance surface 31Q of a totally reflective prism portion 31B and then deviating from the path to the total reflection surface 31R travel longer distances in a direction of the radius of the Fresnel lens 31, they exit from the exit surface 31X of the Fresnel lens 31 and then become light beams be1' and be2', respectively. As a result, they are absorbed by a corresponding one of the plurality of photoabsorptive layers 52A that are laminated in substantially parallel with the optical axis of the Fresnel lens 31.

Figure 13:
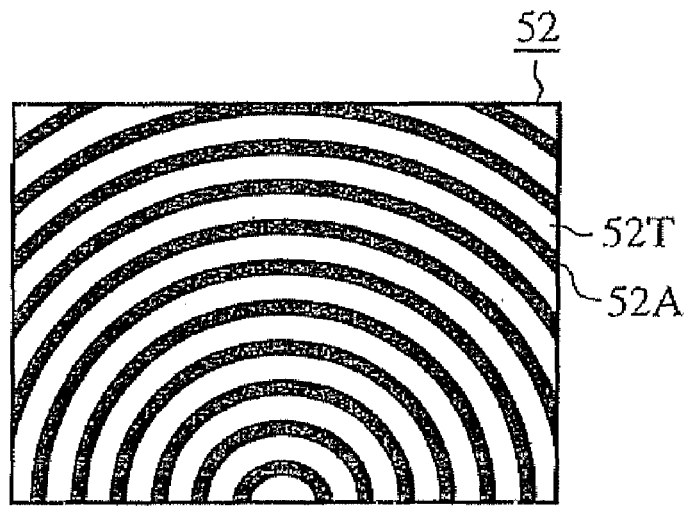
FIG. 13 is a diagram showing a pattern of the structure of light transmission layers and photoabsorptive layers formed in a stray light absorptive plate of the image display system in accordance with embodiment 5 of the present invention.
Figure 13:
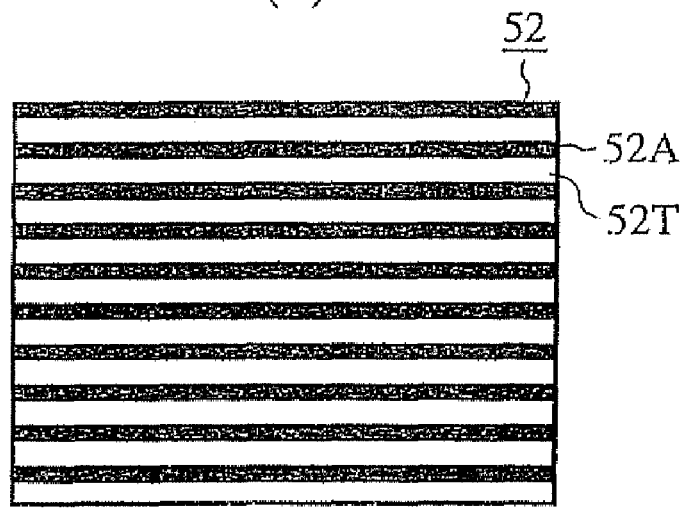

The light beams b3 and b4 respectively received by the entrance surface 31P of a refractive prism portion 31A and the entrance surface 31Q of a totally reflective prism portion 31B exit from the exit surface 31X, too, and then become light beams b3' and b4' respectively A part of them is then absorbed by photoabsorptive layers 52A. However, because those light beams b3' and b4' exit from the exit surface 31X and travel in a direction substantially parallel to the optical axis of the Fresnel lens 31, the amount of light absorbed by photoabsorptive layers 52A is very little. Although the most of the light beams b3' and b4' is passed through a light transmission layer 52T and travels toward the lenticular 32 not shown in the figure, it doesn't cause a big problem, In the stray light absorptive plate, the plurality of light transmission layers 52T and the plurality of photoabsorptive layers 52A can be so laminated alternately that they are concentrically (or radially) arranged with respect to the optical axis of the Fresnel lens 31, as shown in FIG. 13(a) As an alternative, as shown in FIG. 13(b), the plurality of light transmission layers 52T and the plurality of photoabsorptive layers 52A can be laminated alternately in the vertical direction in the figure so that they are extending in the horizontal direction in the figure. In this case, when the display means 30 has a screen of 3:4 aspect ratio, the length of the vertical direction side of the stray light absorptive plate corresponds to 3 and the length of the horizontal direction side of the stray light absorptive plate corresponds to 4.

The use of the structure of FIG. 13(a) can further improve the efficiency of the absorption of stray light beams. The use of the structure of FIG. 13(b) can facilitate the manufacturing of the stray light absorptive plate 52 and can reduce the cost of manufacturing the stray light absorptive plate 52.

The length (i.e., the thickness of each light transmission layer 52T) of predetermined intervals at which the plurality of photoabsorptive layers 52A are laminated can be matched to the length of pitches at which prism portions are formed in the Fresnel lens 31, or can be varied with distance from the optical axis of the Fresnel lens 31. In other words, the length of predetermined intervals at which the plurality of photoabsorptive layers 52A are laminated can be designed freely according to the specifications of the image display system. It is also to be noted that the plurality of laminated photoabsorptive layers 52A should have pitches that can avoid the generation of Moire fringes due to interference with the periodic structure of the Fresnel lens 31 and the lenticular 32 not shown in the figure.

In accordance with another variant, the exit surface 31X of the Fresnel lens 31 has a plurality of slits formed therein and having a pattern corresponding to the plurality of laminated photoabsorptive layers 52A as shown in FIG. 13(a) or 13(b), each of the plurality of slits having a photoabsorptive layer 52A filled therein. In this case, it is preferable to form the plurality of photoabsorptive layers 52A by filling the plurality of slits with a photoabsorptive coating substance. Thus, because the stray light absorptive plate 52 is formed in the exit surface 31X of the Fresnel lens 31 so that the stray light absorptive plate 52 is integral with the Fresnel lens 31, the number of parts included in the image display system can be reduced.

Figure 14:
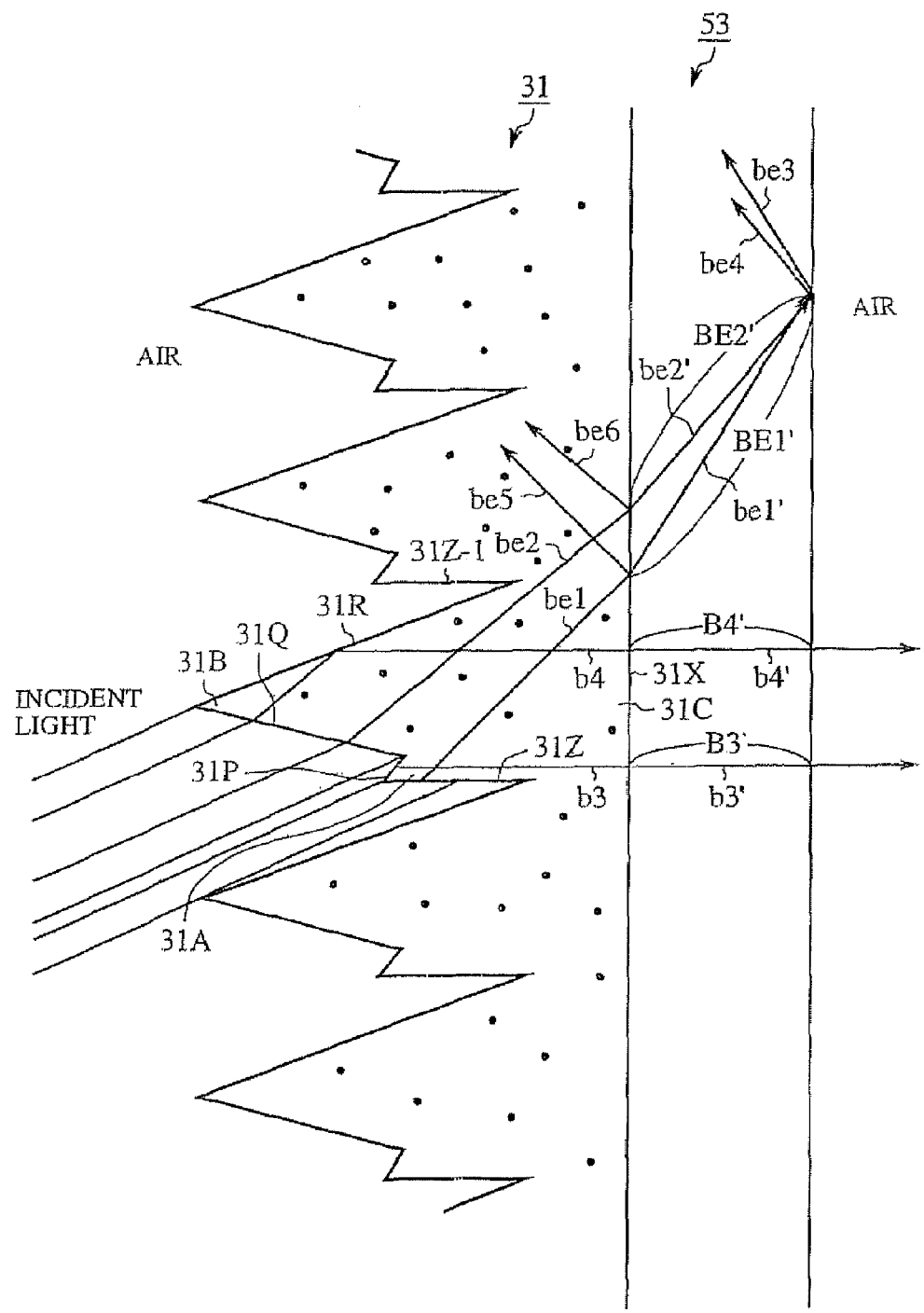
FIG. 14 is a diagram showing the cross-sectional shape of a Fresnel lens applied to display means of the image display system in accordance with embodiment 5 of the present invention.

FIG. 14 is a diagram showing the cross-sectional shape of another example of the Fresnel lens applied to the display means of the image display system in accordance with embodiment 5 of the present invention, and shows a mechanism for absorbing stray light beams, which originate from light beams received by ineffective surfaces of prism portions formed in the Fresnel lens, at an exit surface of the Fresnel lens. The same reference numerals as shown in FIGS. 3, 9, and 12 designate the same components.

In FIG. 14, reference numeral 53 denotes a photoabsorptive plate disposed on the exit surface 31X of the Fresnel lens 31. The photoabsorptive plate 53 is a parallel plate having exit and entrance surfaces substantially parallel to the exit surface 31X of the Fresnel lens 31.

As illustrated in FIG. 12, because both a stray light beam be1 and a stray light beam be2 travel longer distances in a direction of the radius of the Fresnel lens 31, the optical path lengths BE1' and BE2' of stray light beams be1' and be2' within the photoabsorptive plate 53 are larger than the optical path lengths B3' and B4' of light beams b3' and b4' that are received by way of the entrance surface 31P of a refractive prism portion 31A and the entrance surface 31Q of a totally reflective prism portion 31B and that exit from the exit surface 31X of the Fresnel lens 31, respectively. The stray light beams be1' and be2' are therefore absorbed more greatly by the photoabsorptive plate 53 only by the differences between the optical path lengths BE1' and BE2' thereof and the optical path lengths B3' and B4', respectively. As a result, the intensities of the stray light beams be1' and be2' when emitted out of the photoabsorptive plate 53 can be reduced.

Furthermore, stray light beams be3 and be4 that are caused by multiple reflection of the stray light beams be1' and be2' within the photoabsorptive plate 53 (i.e., at the exit surface of the photoabsorptive plate) are absorbed more greatly by the photoabsorptive plate and their intensities are therefore reduced to less than those of the stray light beams be1' and be2' because they have longer optical path lengths dependent upon the number of times that they are reflected at the exit surface of the photoabsorptive plate. Therefore, those multiple-reflected stray light beams be3 and be4 don't cause any problem.

In addition, because stray light beams be5 and be6 that are reflected at the entrance surface of the photoabsorptive plate 53 are incident upon the photoabsorptive plate 53 after refracted and reflected (multiple times) by some boundary parts of the Fresnel lens 31, the intensities of those stray light beams be5 and be6 can be further reduced only by refraction and reflection losses incurred at those boundary parts of the Fresnel lens 31.

Thus, this variant offers an advantage of being able to absorb stray light beams with a simple structure using the photoabsorptive plate 53 and to avoid the generation of multiple images on the screen of the display means 30.

In another variant, arbitrary two or more of the above-mentioned mechanisms, as shown in FIGS. 11 to 14, for avoiding the generation of multiple images can be combined to absorb stray light beams. For example, by applying a combination of photoabsorptive layers 51 and a stray light absorptive plate 52 or a combination of photoabsorptive layers 51 and a photoabsorptive plate 53 to the Fresnel lens 31, stray light beams can be absorbed more effectively and therefore the generation of multiple images on the screen of the display means 30 can be avoided more effectively.

As mentioned above, in accordance with this embodiment 5, the thin-film photoabsorptive layer 51 for absorbing light is formed on the ineffective surface 31Z, 31Z-1, or . . . of each refractive prism portion 31A of the Fresnel lens. Therefore, the present embodiment offers an advantage of being able to prevent stray light beams from being generated, thereby avoiding the generation of multiple images on the screen of the display means 30.

In accordance with this embodiment 5, the image display system can be provided with the stray light absorptive plate 52 in which a plurality of photoabsorptive layers 52A and a plurality of light transmission layers 52T are so laminated alternately that they are arranged in substantially parallel with the optical axis of the Fresnel lens 31, the stray light absorptive plate 52 being disposed on the exit surface 31X of the Fresnel lens 31. Therefore, the present embodiment offers an advantage of being able to absorb stray light beams generated within the Fresnel lens 31, thereby avoiding the generation of multiple images on the screen of the display means 30.

In addition, in accordance with this embodiment 5, the stray light absorptive plate 52 can be formed on the exit surface 31X of the Fresnel lens 31 so that the stray light absorptive plate 52 is integral with the Fresnel lens 31. Therefore, the present embodiment offers another advantage of being able to absorb stray light beams with fewer parts count.

Furthermore, in accordance with this embodiment 5, the plurality of light transmission layers 52T and the plurality of photoabsorptive layers 52A can be so laminated alternately that they are concentrically (or radially) arranged with respect to the optical axis of the Fresnel lens 31. Therefore, the present embodiment offers another advantage of being able to further improve the efficiency of the absorption of stray light beams In addition, in accordance with this embodiment 5, the plurality of light transmission layers 52T and the plurality of photoabsorptive layers 52A can be so laminated alternately that they are arranged in substantially parallel with a certain direction. Therefore, the present embodiment offers a further advantage of being able to facilitate the manufacturing of the stray light absorptive plate 52 and to reduce the cost of manufacturing the image display system.

Furthermore, in accordance with this embodiment 5, the photoabsorptive plate 53 can be disposed on the exit surface 31X of the Fresnel lens 31. Therefore, the present embodiment offers another advantage of being able to absorb stray light beams with a simple structure and to avoid the generation of multiple images on the screen of the display means 30.

INDUSTRIAL APPLICABILITY

As mentioned above, the image display system in accordance with the present invention is suitable for the slimming down thereof, and for performing an enlarged display of an image while controlling the distortion of the image,

The invention claimed is:

1. An image display system comprising:
a transmission system for providing image information to illuminating light and for transmitting the illuminating light as an optical image signal;
a projective optical system provided with a refractive optical unit for projecting said optical image signal transmitted thereto from said transmission system and a reflective optical unit for reflecting said optical image signal projected by said refractive optical unit; and
a display for receiving said optical image signal by way of said projective optical system and for displaying an image based on said image information,
wherein said transmission system is placed below a horizontal plane including an optical axis of said projective optical system and is also placed between a front surface of said display and a rear surface of said projective optical system, and said display is placed above the horizontal plane including the optical axis of said projective optical system, and
wherein said display is so placed as to be substantially perpendicular to the optical axis of said projective optical system.

2. The image display system according to claim 1, wherein the front surface of said display is defined based on said image display system, and the rear surface of the projective optical system is defined based on said image display system.

3. The image display system according to claim 1, wherein both an image exit surface of light valve means, which constitutes said transmission system, and said display are so arranged that they are substantially parallel to each other.

4. The image display system according to claim 1, wherein said projective optical system is provided with at least one optical path bending element that is disposed on an optical path extending from said transmission system to said display.

5. The image display system according to claim 4, wherein said optical path bending element is so placed that a normal vector that is oriented in a direction of a normal to a reflecting surface of said optical path bending element is substantially parallel to a plane including the optical axis of said projective optical system and being parallel to a lower side of an image display screen of said display.

6. The image display system according to claim 1, wherein said projective optical system comprises at least one optical path bending element disposed on an optical path extending from said transmission system to said display, for bending the optical path in a substantially-horizontal plane.

7. The image display system according to claim 1, wherein said display comprises a Fresnel lens having at least one pitch at which a totally reflective prism portion is formed.

8. The image display system according to claim 1, wherein said display comprises a Fresnel lens having at least one pitch at which two or more different-type prism portions are formed.

9. The image display system according to claim 8, wherein when a refractive prism portion is formed in said Fresnel lens, said display is provided with a thin-film photoabsorptive layer disposed on an ineffective surface of said refractive prism portion, for absorbing light.

10. The image display system according to claim 8, wherein said display further comprises a stray light absorptive plate including a plurality of light transmission layers for allowing light to pass there through and a plurality of photoabsorptive layers for absorbing incident light, each of which is sandwiched between two of the plurality of light transmission layers so that said plurality of photoabsorptive layers are arranged in substantially parallel with an optical axis of said Fresnel lens, said stray light absorptive plate being disposed on an exit surface of said Fresnel lens.

11. The image display system according to claim 10, wherein said stray light absorptive plate of said display is integrally formed on the exit surface of said Fresnel lens.

12. The image display system according to claim 10, wherein in said stray light absorptive plate of said display, the plurality of light transmission layers and the plurality of photoabsorptive layers are so laminated that they are concentrically arranged with respect to the optical axis of said Fresnel lens.

13. The image display system according to claim 10, wherein in said stray light absorptive plate of said display, the plurality of light transmission layers and the plurality of photoabsorptive layers are so laminated that they are arranged in substantially parallel with a certain direction.

14. The image display system according to claim 8, wherein said display further comprises a photoabsorptive plate disposed on an exit surface of said Fresnel lens, for absorbing light.

15. The image display system according to claim 1, wherein said display comprises a Fresnel lens in which prism portions are formed in both an entrance surface and an exit surface of said Fresnel lens.

* * * * *